United States Patent [19]

Herceg

[11] Patent Number: 4,476,197

[45] Date of Patent: Oct. 9, 1984

[54] INTEGRAL MANIFOLDING STRUCTURE FOR FUEL CELL CORE HAVING PARALLEL GAS FLOW

[75] Inventor: Joseph E. Herceg, Naperville, Ill.

[73] Assignee: The United States of America as represented by the United States Department of Energy, Washington, D.C.

[21] Appl. No.: 541,178

[22] Filed: Oct. 12, 1983

[51] Int. Cl.³ ............................................... H01M 8/10
[52] U.S. Cl. ........................................ 429/32; 429/33; 429/34
[58] Field of Search ............................... 429/32, 33, 34

[56] References Cited

U.S. PATENT DOCUMENTS

| | | | |
|---|---|---|---|
| 3,558,360 | 1/1971 | Sverdrup et al. | 136/86 |
| 3,617,385 | 11/1971 | Gray | 136/86 |
| 3,754,995 | 8/1973 | Kleinschmager | 136/86 R |
| 3,834,943 | 9/1974 | Van den Berghe et al. | 136/86 D |
| 3,905,775 | 9/1975 | Sowards et al. | 23/288 FC |
| 4,142,024 | 2/1979 | Van den Berghe et al. | 429/41 |
| 4,195,119 | 3/1980 | Kummer | 429/38 |
| 4,248,941 | 2/1981 | Louis | 429/13 |
| 4,317,867 | 3/1982 | Warzawski | 429/42 |
| 4,324,844 | 4/1982 | Kothmann | 429/34 |

Primary Examiner—Charles F. LeFevour
Attorney, Agent, or Firm—Charles F. Lind; Hugh W. Glenn; Michael F. Esposito

[57] ABSTRACT

Disclosed herein are manifolding means for directing the fuel and oxidant gases to parallel flow passageways in a fuel cell core. Each core passageway is defined by electrolyte and interconnect walls. Each electrolyte and interconnect wall consists respectively of anode and cathode materials layered on the opposite sides of electrolyte material, or on the opposite sides of interconnect material. A core wall projects beyond the open ends of the defined core passageways and is disposed approximately midway between and parallel to the adjacent overlaying and underlying interconnect walls to define manifold chambers therebetween on opposite sides of the wall. Each electrolyte wall defining the flow passageways is shaped to blend into and be connected to this wall in order to redirect the corresponding fuel and oxidant passageways to the respective manifold chambers either above or below this intermediate wall. Inlet and outlet connections are made to these separate manifold chambers respectively, for carrying the fuel and oxidant gases to the core, and for carrying their reaction products away from the core.

20 Claims, 9 Drawing Figures

INTEGRAL MANIFOLDING STRUCTURE FOR FUEL CELL CORE HAVING PARALLEL GAS FLOW

CONTRACTURAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

A fuel cell is basically a galvanic energy conversion device that chemically combines hydrogen or a hydrocarbon fuel and an oxidant within catalytic confines to produce a DC electrical output. In one form of fuel cell, cathode material defines the passageways for the oxidant and anode material defines the passageways for the fuel, and an electrolyte separates the cathode and anode materials. The fuel and oxidant, typically as gases, are then continuously passed through the cell passageways separated from one another, and unused fuel and oxidant discharged from the fuel cell generally also remove the reaction products and heat generated in the cell. Being infeeds, the fuel and oxidant are typically not considered an integral part of the fuel cell itself.

The type of fuel cell for which this invention has direct applicability is known as the solid electrolyte or solid oxide fuel cell, where the electrolyte is in solid form in the fuel cell. In the solid oxide fuel cell, hydrogen or a high order hydrocarbon is used as the fuel and oxygen or air is used as the oxidant, and the operating temperatures of the fuel cell is between 700° and 1,100° C.

The hydrogen reaction on the anode (the negative electrode) with oxide ions generates water with the release of electrons; and the oxygen reaction on the cathode with the electrons effectively forms the oxide ions. Electrons flow from the anode through the appropriate external load to the cathode, and the circuit is closed internally by the transport of oxide ions through the electrolyte. The electrolyte insulates the cathode and anode from one another with respect to electron flow, but permits oxygen ions to flow from the cathode to the anode. Thus, the reactions are, at the:

$$\text{cathode: } \tfrac{1}{2}O_2 + 2e^- \rightarrow O^{-2} \qquad (1)$$

$$\text{anode: } H_2 + O^{-2} \rightarrow H_2O + 2e^-. \qquad (2)$$

The overall cell reaction is $$H_2 + \tfrac{1}{2}O_2 \rightarrow H_2O. \qquad (3)$$

In addition to hydrogen, the fuel can be derived from a hydrocarbon such as methane ($CH_4$) reformed by exposure to steam at 350° C. or above, which initially produces carbon monoxide (CO) and three molecules of hydrogen. As hydrogen is consumed, a shift in reaction occurs to $$CO + H_2O \rightarrow CO_2 + H_2. \qquad (4)$$

The overall reaction of hydrocarbons in the cell is illustrated by $$CH_4 + 2O_2 \rightarrow CO_2 + 2H_2O. \qquad (5)$$

Inasmuch as the conversion is electrochemical, the thermal limitations of the Carnot cycle are circumvented; therefore efficiencies in the range exceeding 50% fuel heat energy conversion to electrical output can be theoretically obtained. This is much higher than equivalent thermal engines utilizing the same fuel conversion, including even a conventional diesel powered engine.

The electrolyte isolates the fuel and oxidant gases from one another while providing a medium allowing the ionic transfer and voltage buildup across the electrolyte. The electrodes (cathode and anode) provide paths for the internal movement of electrical current within the fuel cell to the cell terminals, which also connect then with an external load. The operating voltage across each cell is of the order of 0.7 volts maximum, so the individual cells must be placed in electrical series to obtain a useful load voltage. A series connection is accomplished between adjacent cells with an interconnect material which isolates the fuel and oxidant gases from one another while yet electronically connects the anode of one cell to the cathode of an adjoining cell. As the active electrochemical generation of electricity takes place only across the electrolyte portions of the fuel cell, any interconnect separation between the cathode and anode in order to provide the series electrical connection between the cells renders that part of the fuel cell electrically nonproductive. The percentage of interconnect to electrolyte wall area defining each cell, if high, could significantly reduce the energy or power densities of such a fuel cell.

Diffusion of the reacting species (fuel or oxidant) through the electrodes to the electrolyte also limits the cell performance. Fuel and oxidant must diffuse away from the flow in the respective passageways through the electrolyte to the reaction sites. The fuel and oxidant diffuse through the electrodes to the electrolyte and react at (or near) the three-phase boundary of the gases, the electrodes (anode or cathode), and electrolyte, where electrochemical conversion occurs. As the hydrogen partial pressure of the fuel gases decreases along the length of the fuel passageways, less voltage is generated near or at the downstream end of the fuel passageways.

While it is possible to thermally and electrically extract great quantities of energy from the fuel, it is also inherently inefficient to extract such energies to the complete depletion of the fuel and oxidant. Complete conversion of the fuel in the fuel cell is thus not sought as it is intrinsically inefficient in the overall output of the cell voltage. For both a single cell and cells in gas flow series, the maximum theoretical voltage decreases along the cell. Practical fuel cells therefore consume only 80 to 90% of the fuel because the cell voltage decreases rapidly as the hydrogen becomes less than 5% of the fuel gas. The reduction in maximum cell voltage as the fuel is consumed is an important limitation.

One proposed series of solid oxide fuel cells utilizes a ceramic support tube, and the electrodes (anode and cathode) and electrolyte are built up as layers on the support tube. The support tube is confined in a sealed housing, and the fuel and oxidant are manifolded to the housing and the reaction products are ported from the housing as required. Depending on the layer build-up, the fuel is either conveyed internally of the support tube and the oxidant is conveyed externally of the support tube (or vice versa). A practical fuel cell unit would be composed of many such tubes supported within an exterior housing, and manifolding would separate and direct the fuel and oxidant proximate the tubes.

A typical support tube might be formed of calcium stabilized zirconia ($ZrO_2+CaO$); the cathode typically would be applied to the exterior face of the support tube and might be in the form of lanthanum manganite ($LaMnO_3$); the electrolyte would be layered over a portion of the cathode, comprised, for example, of yttria-stabilized zirconia ($ZrO_2+Y_2O_3$); and the anode would be layered over the electrolyte comprised, for example, of a cobalt yttria-stabilized zirconia cermet or mixture ($Co+ZrO_2+Y_2O_3$). The oxidant would thereby flow internally of the structural tube while fuel will be circulated externally of the tube. For part of the cell where a series connection was to be made with an adjacent cell, the interconnection would be layered over the cathode at this location instead of the electrolyte and anode, to engage the anode of the adjacent cell. The interconnect might be comprised for example, of lanthanum chromite ($LaCrO_3$).

To form this type of fuel cell, the support tube must be formed with a high degree of porosity. Even with 40% porosity, the layered anode and cathode represent large diffusion barriers. The diffusion losses increase very steeply at high current densities and represent a limit on current and hence power. The minimum size of the support tube has been about 1 cm in diameter, with a side wall about 1 mm thick. A limiting factor of this support tube core arrangement is the length of path that the current must pass along the cathode and anode materials thereby inducing significant electrical resistant losses. In one effort to minimize this, the respective tubes have been shortened lengthwise and stacked end-to-end on one another, and the anodes and cathodes of the successive respective tubes have been interconnected in a serial fashion with an interconnect. This renders a single tube through which the fuel and/or oxidant passes, while the serial connection produces a higher voltage cumulative of the total number of serially interconnected individual tubes. The current flow is in line with the direction of the fuel and/or oxidant flow, namely axially of the tube configuration.

An alternate construction provides an electrical interconnect at a cordal arc section of the tube connected to the interior anode, for example, whereby adjacent tubes are stacked tangentially adjacent one another to establish a cathode-anode serial arrangement. As the current must pass circumferentially along the cathode and anode materials, significant electrical resistance losses are incurred.

Moreover, the tube supports are nonproductive and heavy so that the power and energy densities suffer when compared to other forms of energy conversion, including even the liquid electrolyte fuel cells more commonly operated at lower temperatures.

In many prior designs of solid oxide fuel cells, a feed tube for the oxidant must fit within the oxidant passageway which thus provides that this passageway must be sufficiently large to receive this tube. The power density of the fuel cells is related to the cell size, so that reduction in cell size provides for higher power density.

SUMMARY OF THE INVENTION

This invention provides a solid oxide fuel cell having improved manifolding for fuel and oxidant gases flowing to the core and for the gaseous reaction products discharging from the core.

This invention relates to a solid oxide fuel cell having a core defining a plurality of elongated passageways for carrying fuel and oxidant gases. Fuel flow passageways are defined each having only anode material on the inside face thereof, and oxidant flow passageways are defined each having only cathode material on the inside face thereof. The cathode and anode materials are separated from one another in certain regions of the core by an electrolyte material to define an electrolyte wall across which electrical potential is generated; and the cathode and anode materials are separated from one another in other regions of the core by an interconnect material to define an interconnect wall across which the electrical potentials generated at the electrolyte walls are added together in series. The anode and cathode passageways are oriented parallel to one another between spaced generally parallel interconnect walls and electrolyte walls angled back and forth between adjacent pair of the adjacent interconnect walls.

This invention specifically relates to the manifolding of the fuel and oxidant gases to the array of parallel anode and cathode passageways, respectively that open onto opposite side faces of the core. Separator walls extend from the core side faces, each separator wall being disposed approximately midway between and parallel to the adjacent overlying and underlying interconnect walls to define manifold chambers therebetween on opposite sides of each intermediate separator wall. Each angled electrolyte wall defining the flow passageways is shaped to blend into this intermediate separator wall, and thereby redirects the corresponding fuel and oxidant passageways to the respective manifold chambers either above or below this intermediate wall. Inlet and outlet connections are made to these separate manifold chambers respectively for the fuel and oxidant gases and for their reaction products.

The cell manifolding eliminates the need for oxidant feed tubes, so that the cell passageway cross section can be made very small and determined by balancing the resistance of the oxidant or fuel gas flow against the volume of such gas required. The small cell passageways provide high power densities.

RELATED COFILED APPLICATIONS AND INVENTIONS

The application Ser. No. 541,213 entitled "Solid Oxide Fuel Cell Having Monolithic Core" cofiled herewith having John P. Ackerman and John E. Young as joint inventors, discloses a monolithically formed core consisting only of materials active in the electrochemical reactions. This means that the electrolyte and interconnect walls of the core would be formed respectively, only of anode and cathode materials layered on the opposite sides of electrolyte material, or on the opposite sides of interconnect material. This allows the use of very thin material layers and very thin resulting composite core walls. The thin composite core walls can be shaped to define small passageways, while yet having sufficient structural integrity to withstand the fluid pressures generated by gas flow through the passageways and the mechanical stresses due to the weight of the stacked core walls on one another. This beneficially increases the power denisty of the fuel cell because of its reduced size and weight.

The application Ser. No. 541,184 entitled "Method of Fabricating a Monolithic Core For a Solid Oxide Fuel Cell" cofiled herewith having Stanley A. Zwick and John P. Ackerman as joint inventors, discloses the repetitive and sequential application of deposits of each of the anode, cathode, electrolyte and interconnect materials onto itself for building up the interconnect and electrolyte core walls endwise of the walls or in line with the flow passageways defined by the walls. Each separate deposit of each separate material is made over the entire core cross section simultaneously, whereby complicated shapes or cross sections of the flow passageways for the fuel and oxidant can be made as simply as can regular or symmetrical overall cross sections be made.

The application Ser. No. 541,177 entitled "Solid Oxide Fuel Cell Having Monolithic Cross Flow Core and Manifolding" cofiled herewith having Roger B. Poeppel and Joseph T. Dusek as joint inventors, discloses a monolithic core construction having the flow passageways for the fuel and for the oxidant gases extended transverse to one another, whereby full face core manifolding can be achieved for these gases and their reaction products. The core construction provides that only anode material surround each fuel passageway and only cathode material surround each oxidant passageway, each anode and each cathode material further being sandwiched at spaced opposing sides between electrolyte and interconnect materials. These composite anode and cathode wall structures are further alternately stacked on one another (with the separating electrolyte or interconnect material typically being a single common layer) whereby the fuel and oxidant passageways are disposed transverse to one another.

The application Ser. No. 541,176 entitled "Solid Oxide Fuel Cell Having Compound Cross Flow Gas Patterns" cofiled herewith having Anthony V. Fraioli as sole inventor, discloses a core construction having both parallel and cross flow paths for the fuel and the oxidant gases. Each interconnect wall of the cell is formed as a sheet of inert support material having therein spaced small plugs of interconnect material, the cathode and anode materials being formed as layers on opposite sides of each sheet and being electrically contacted together by the plugs of the interconnect material. Each interconnect wall in a wavy shape is connected along spaced generally parallel line-like contact areas between corresponding spaced pairs of generally parallel electrolyte walls, operable to define one tier of generally parallel flow passageways for the fuel and oxidant gases. Alternate tiers are arranged to have the passageways disposed normal to one another. This provides for the solid mechanical connection of the interconnect walls of adjacent tiers to the opposite sides of the common electrolyte wall therebetween only at spaced point-like contact areas, where the previously mentioned line-like contact areas cross one another. The inert support material comprises between 2 and 98 wt.% of the whole core, varied as needed to minimize differential thermal expansion of the composite core wall structures.

DETAILED DESCRIPTION OF THE PREFERRED EMBODIMENT

Figure 1:
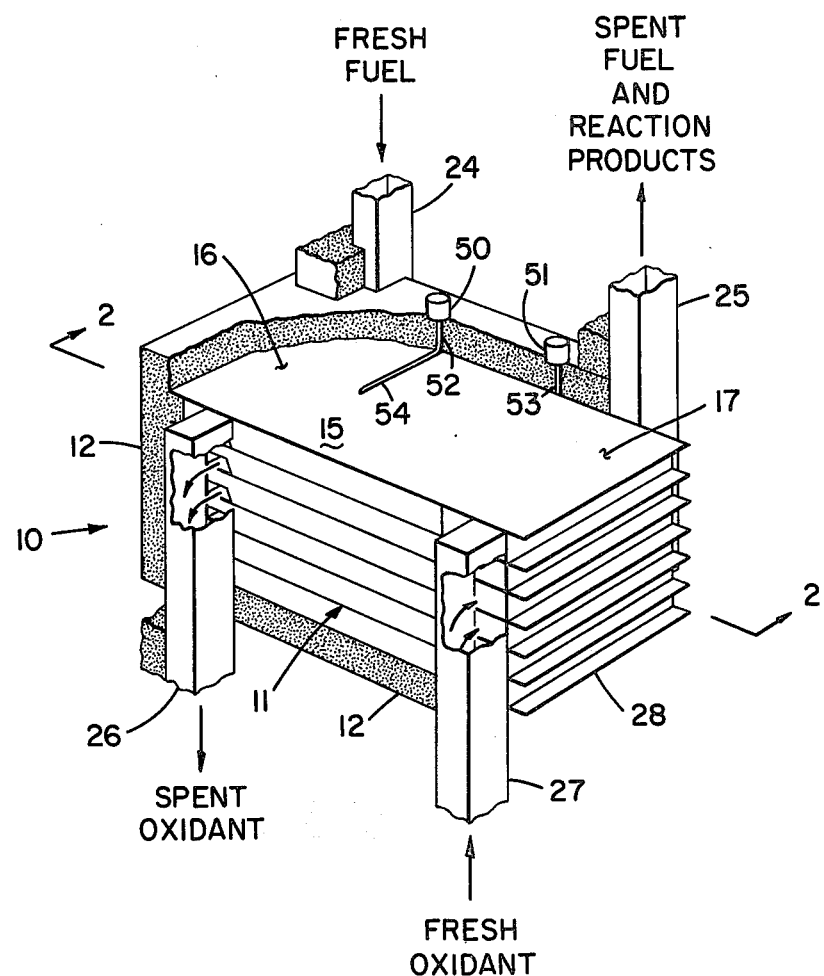
FIG. 1 is a perspective view, partly broken away for clarity of disclosure, of a fuel cell formed according to one embodiment of the invention.

FIG. 1 illustrates a fuel cell 10 having a core 11 located within and surrounded by insulation 12. The core 11 is a one piece assembly (see FIGS. 2, 3 and 4) having a central electrode region 15 and spaced endward manifolding regions 16 and 17. Passageways 13 and 14 extend through the central electrode region 15 of the core 11 between manifold chambers 18, 19, 20 and 21 defined in the manifolding regions 16 and 17; chambers 18 and 19 communicating with one another via passageways 13, and chambers 20 and 21 communicating with one another via passageways 14. Duct structures 24, 25, 26, 27 line up with the manifold chambers serving to communicate through openings in the side wall of the core with the chambers; ducts 24 and 25 communicating with chambers 18 and 19, respectively, and ducts 26 and 27 communicating with chambers 20 and 21, respectively. In the illustrated embodiment, the manifold chambers 18 and 20, and 19 and 21 are endwardly offset from one another so that the ducts 24 and 26, and 25 and 27 are also endwardly offset from one another.

Also in the embodiment illustrated, duct 24 is adapted to carry gaseous fuel to the manifold chamber 18 for flow through the passageways 13 serving as anodes, and duct 25 is adapted to carry all unconsumed or remaining fuel and reaction products from the manifold chamber 19. Likewise duct 27 is adapted to carry oxidant to the manifold chamber 21 for flow through the passageways 14 serving as cathodes, and duct 26 is adapted to carry any remaining oxidant away from the manifold chamber 20.

In the illustrated configuration, the fuel cell operates with the fuel and oxidant flowing counter to another; although the flow could also be unidirectional merely by reversing the oxidant flow (for example) where duct 26 would carry the input oxidant and duct 27 would carry the output oxidant and reaction products. The direction of gas flow is thus immaterial to this invention.

Figure 2:
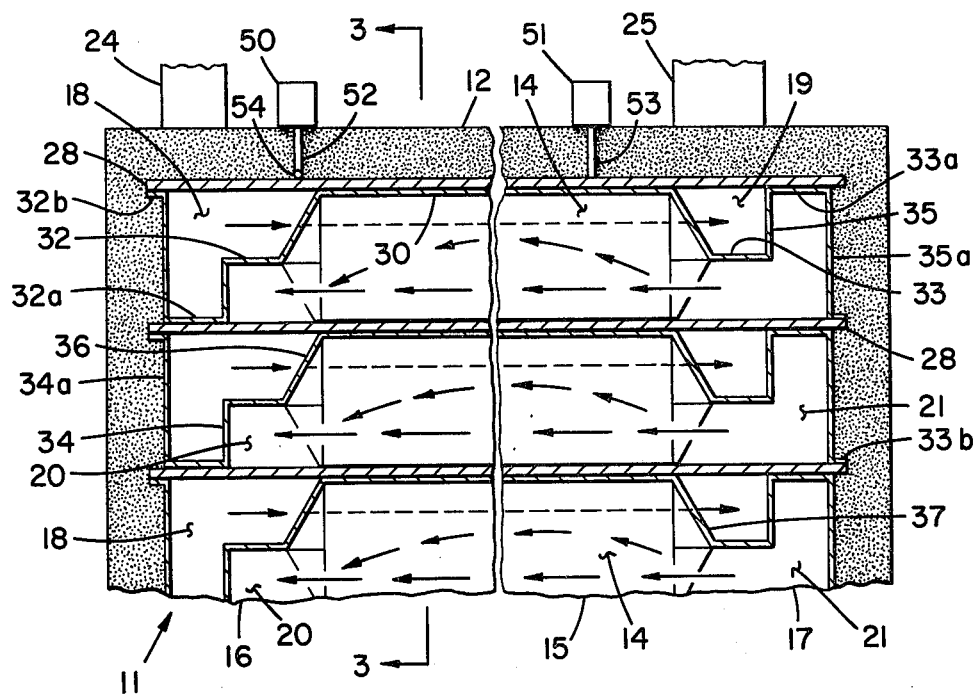
FIG. 2 is an enlarged sectional view as seen generally from line 2—2 in FIG. 1, illustrating in greater detail the construction of the invention.
Figure 3:
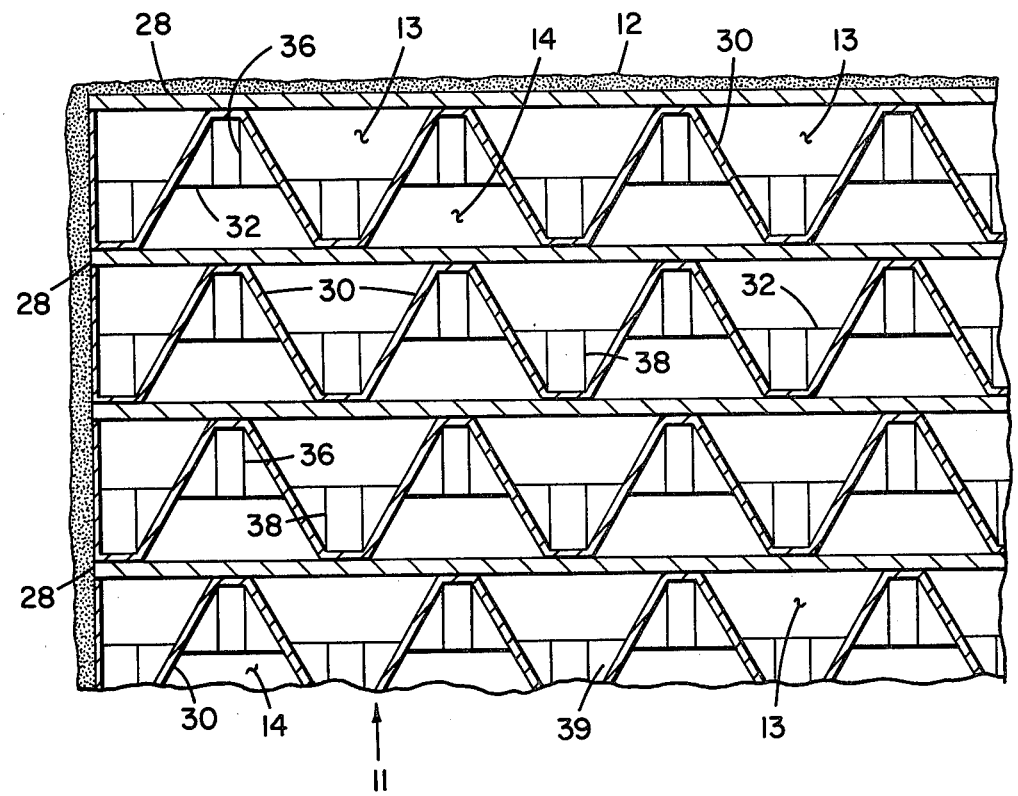
FIG. 3 is an enlarged sectional view as seen generally from line 3—3 in FIG. 2.
Figure 4:
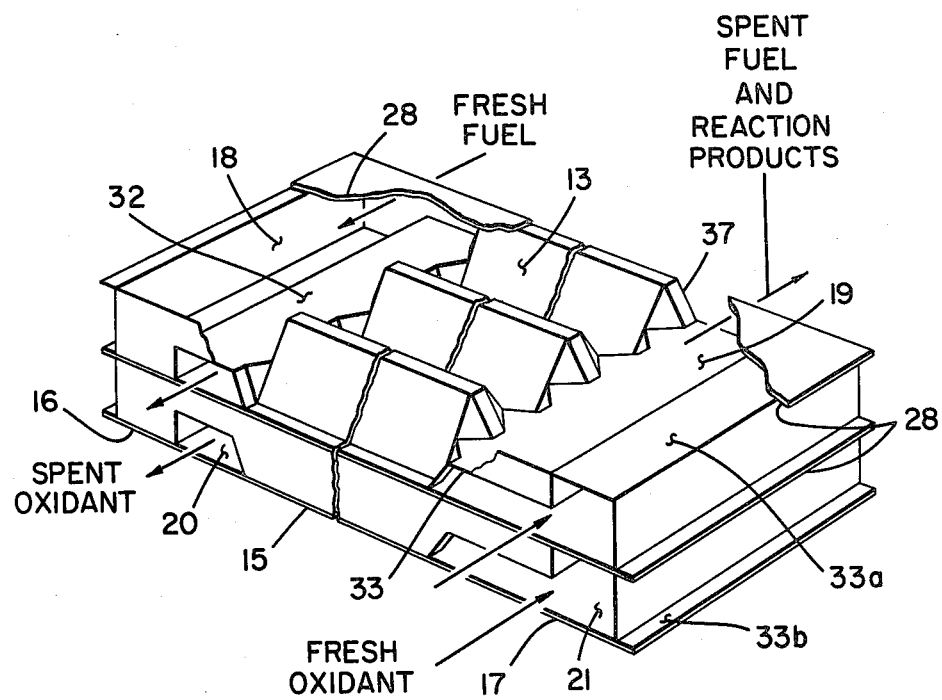
FIG. 4 is a perspective view of the fuel cell of FIG. 1, except being broken away to highlight a typical intermediate separator wall which serves to direct the flow of gases through the fuel cell.

FIGS. 2, 3 and 4 illustrate in greater detail the electrode region 15 of the core 11. Specifically, the individual flow passageways 13 and 14 for the fuel and oxidant gases and their reaction products are defined between generally spaced and parallel interconnect walls 28 and wavy and backfolded electrolyte walls 30. The passageways 28 and 30 are thus somewhat in the shape of a triangle or rhombus (FIG. 3), when viewed in the direction of flow of the gases. The space between each pair of the interconnect walls 28 endwardly beyond the flow passageways is effectively divided in two by an intermediate wall 32, 33 that extends generally in line with the passageways. Each of these intermediate walls (32, 33) extends approximately midway between and parallel to the adjacent overlying and underlying interconnect walls 28 and then is angled transverse to this at 34, 35 to extend to one of the adjacent interconnect walls 28.

The intermediate wall further extends parallel to and flush against the interconnect wall 28 as at 32a, 33a; transverse to this as at 34a, 35a to the opposite adjacent interconnect wall 28; and then parallel to and flush against this interconnect wall. The intermediate walls at 32a, 33a and 32b, 33b are brought flush against the adjacent interconnect wall to be sealed thereto, and the portions at 34a, 35a extended between the adjacent interconnect walls close off the ends of the core manifolding sections 16, 17.

This thus defines the manifold chambers 18, 19, 20 and 21 at the opposite ends of the flow passageways. As illustrated, the manifolds 18, 19, 20 and 21 direct the flow of the gases in directions parallel to the interconnect walls 28 and transversely to the flow passageways 13 and 14.

Each electrolyte wall 30 defining the flow passageways (13 and 14) further is shaped to blend into and be connected to this intermediate wall (32 or 33) in order to redirect the corresponding fuel and oxidant passageways to the respective manifold chambers, either above the walls as chambers 18 and 19 or below the walls as chambers 20 or 21. Thus, angled end wall sections 36, 37, 38, 39 extend between the intermediate walls 32, 33 and the electrolyte walls 30 at the narrow parts (upper or lower) of each passageway to block off the passageways only at these locations. The base or wider part of each passageway is maintained open for effectively communicating the passageway with the corresponding manifold chamber defined adjacent the respective interconnect wall proximate the wider part of the passageway.

Figure 5:
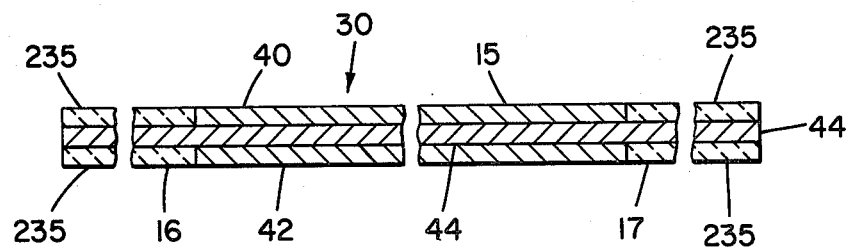
FIG. 5 is an enlarged sectional view of the material forming the intermediate separator wall of the fuel cell of FIG. 1, as referenced generally relative to the sectional view of FIG. 2.

In the disclosed embodiment, passageways 13 are formed with only anode electrode material 40 (see FIG. 5) defining the exposed walls of the passageways to receive the fuel; while the passageways 14 are formed with only cathode electrode material 42 defining the exposed walls of the passageways to receive the oxidant. The anode 40 is separated from the cathode 42 at certain locations within the core by a thin layer of electrolyte material 44 to form the electrolyte walls 30 or "cell". A voltage potential will build up across this electrolyte wall 30 between these electrodes 40 and 42 in the presence of fuel and oxidant. This potential occurs as the fuel in the anode passageways 13 and the oxidant in the cathode passageways 14 electrochemically combine across the electrolyte 44. The voltage is small for each anode and cathode electrode combination (or electrolyte wall 30), generally less than 1.0 volt, and even this voltage drops off when external draw is taken from the electrodes.

At other locations within the core, the anode 40 and cathode 42 are separated by a generally thin layer of interconnect material (not specifically shown) to form the interconnect wall 28. The interconnect wall 28 serves to isolate the fuel and oxidant gases from one another, and also to electrically connect together the anode electrode of the one cell and the cathode electrode of the adjacent cell. This creates thereby a series circuit with the adjacent cells, and thereby progressively accumulates the small separate voltages of the separate cells.

In an actual fuel cell of the type shown herein, the interconnect walls 28 are shown generally planar in shape and extended in generally spaced parallel relationship to one another, while the electrolyte walls 30 are wavy or are generally planar sections, respectively, each back folded on itself to extend between the respective pairs of adjacent interconnect walls 28. This defines a very compact core cross section of alternately adjacent fuel passageways 13 and oxidant passageways 14. Many serially connected anode-cathode cell combinations 30 will be provided, exceeding perhaps even several hundred. The outermost interconnects (or adjacent electrode) of the core 11 are connected electrically via conductors to external terminals 50 and 51 of the fuel cell to provide the cumulative electrical output at the terminals. In FIG. 1, this is illustrated schematically by conductors 52 and 53 connected between terminals 50 and 51, and the uppermost interconnect at contact 54 and the lowermost interconnect (not shown). In this manner, the overall fuel cell voltage at the exterior terminals 50 and 51 might be of the order of between twenty and four hundred volts, depending upon the design.

In the embodiment of FIGS. 1–5, the inlet and outlet duct connections to the separate manifold chambers for carrying the fuel and oxidant gases to the core, and for carrying their reaction products away from the core are at the sides of the core. The manifolding is thus parallel to the interconnect walls 30, but transverse to the flow passageways 13, 14.

Figure 6:
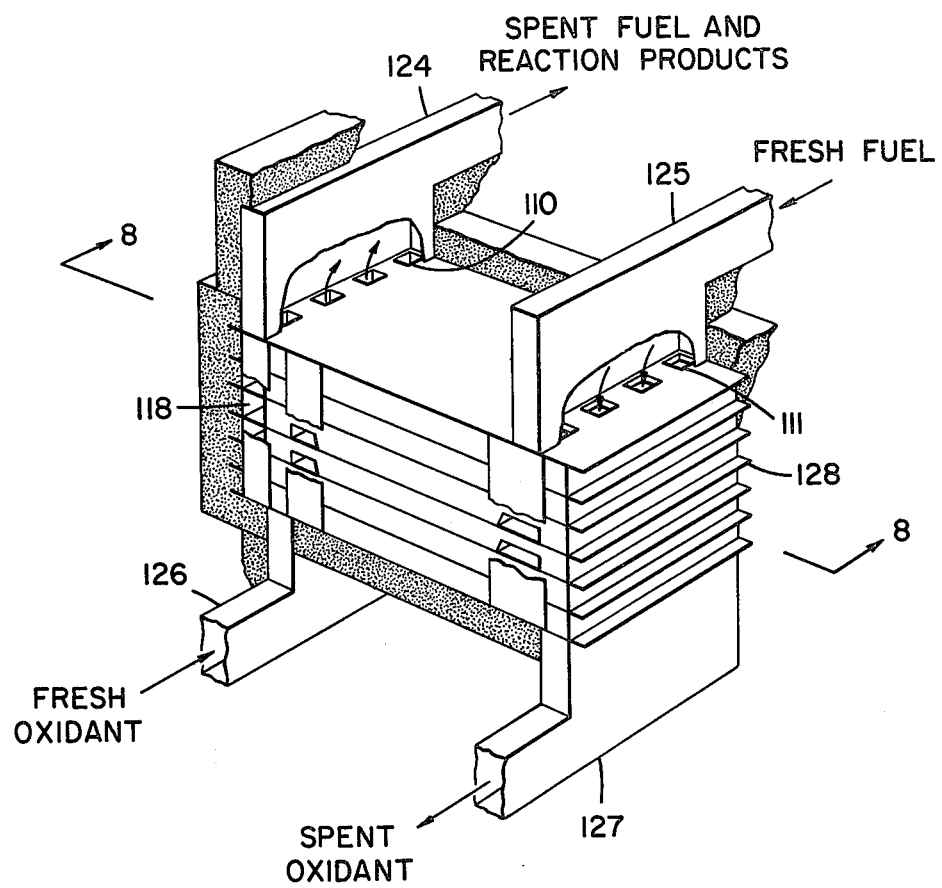
FIGS. 6 and 7 are perspective views corresponding to FIGS. 1 and 4 respectively, except showing an alternate embodiment of the subject invention.
Figure 7:
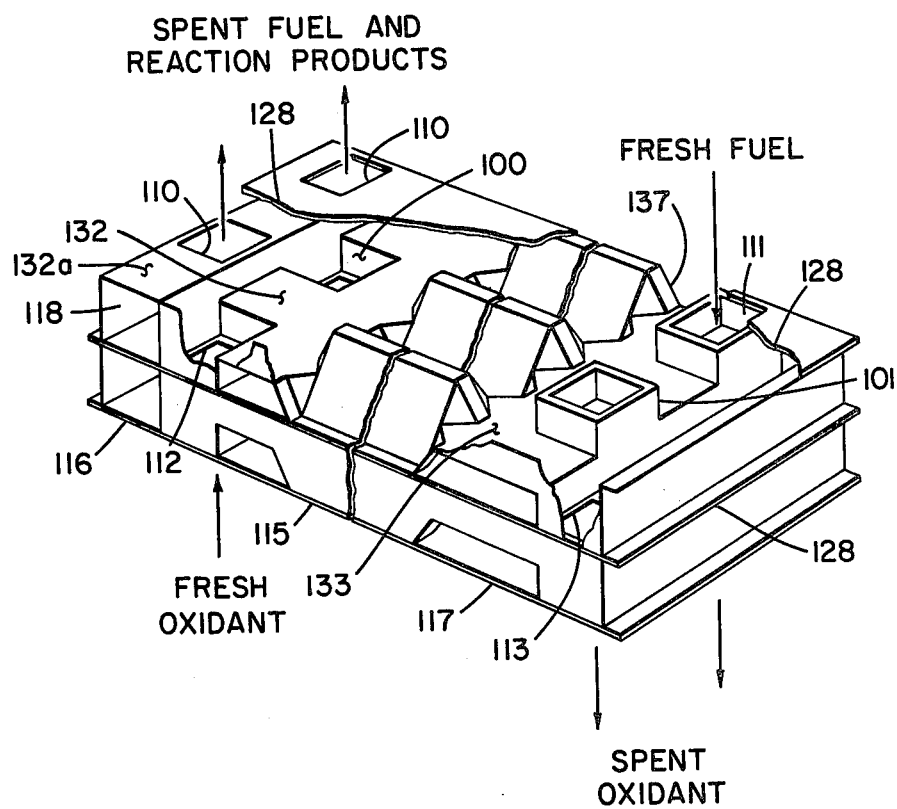
Figure 8:
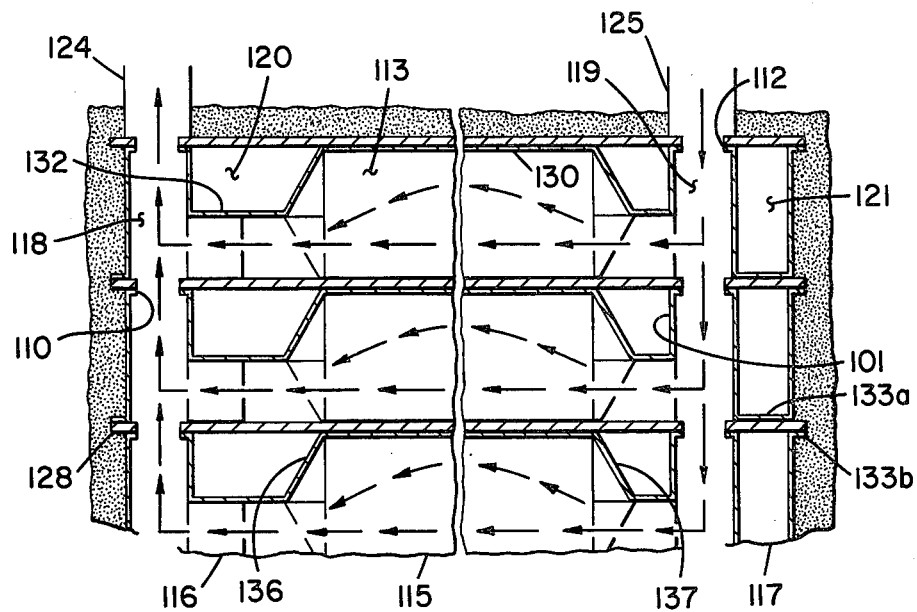
FIGS. 8 and 9 are sectional views as seen generally from lines 8—8 and 9—9 in FIG. 7, showing the different gas flows through the fuel cells.
Figure 9:
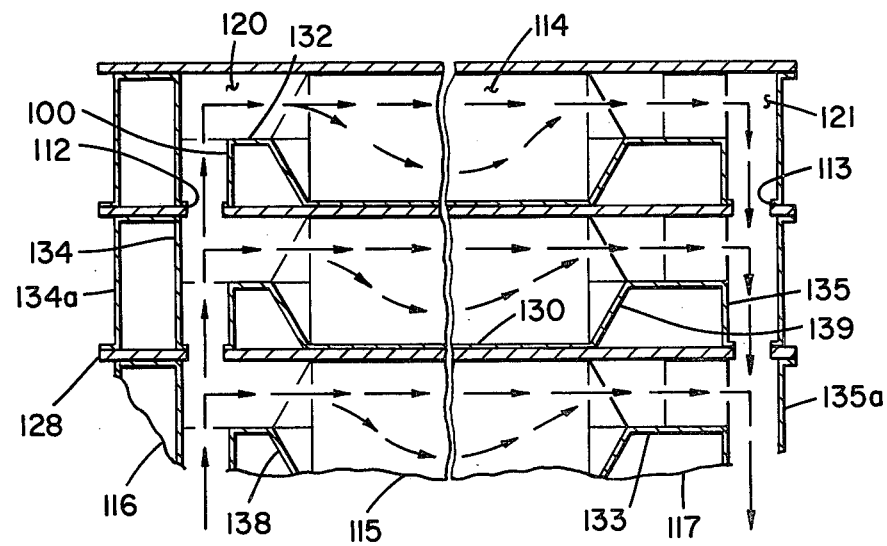

In the embodiment illustrated in FIGS. 6–8, stacks 100 and 101 are located in the manifolding regions 116 and 117 and extend transversely to the interconnect walls between the intermediate wall 132, 133 and the overlying or underlying adjacent interconnect wall 128. Aligned openings 110, 111, 112 and 113 are provided through the interconnect wall 128 (and in certain locations through the coplanar adjacent intermediate wall 128) to allow communication of the vertically stacked similar manifold chambers (118, for example, through openings 110) with one another while yet maintaining the gases separated from one another. In this regard, the stacks 100, (and 101) provide communication of the alternate manifold chambers (120 and chambers 119), while maintaining these manifolds closed from but extending through the corresponding adjacent manifold chambers 118 (and 121). The stacks 100, 101 are folded over at the top or bottom ends to lie flush against the adjacent interconnect wall 128 to establish an effective seal at each of these junctures. The same is true with respect to the segments 132a, 133a, 132b, and 133b of the intermediate wall; while the segments 132, 133, 134 and 135 are extended transverse to the interconnect walls. Likewise, the angled end portions 136, 137, 138 and 139 are blended between the electrolyte walls 130 and the intermediate walls 132, 133.

Thus, the fuel and oxidant gases are maintained separated from one another, but are directed transverse to the flow passageways 113, 114 and the interconnect walls 128 for subsequent flow to the flow passageways at one end and for removal of the remaining reaction products from the opposite end. The ducts 124, 125, 126 and 127 for the fuel cell thus communicate with the manifold chambers through the openings 110, 111, 112 and 113 in the interconnect wall 128 so that the manifolding gas flow is transverse to both the interconnect wall and the flow passageways.

In the preferred embodiment of the disclosed fuel cell core 11 in the electrode region (15 or 115), the core walls are formed by only the active anode, cathode, electrolyte and interconnect materials, and no nonactive material is otherwise used therein for support. Each active material layer when adjacent one another is extremely thin, and the core walls immediately adjacent and defining the fuel and oxidant passageways (13, 113 and 14, 114) are quite short or of small spans to provide that the passageways themselves are of small cross section (perhaps only several square millimeters). The shape of the passageways 13 (113) and 14 (114) can be varied from that shown to circular, hexagonal, rectangular or the like. Also, the anode material 40 is in the form of a thin layer adjacent the thin layer of the electrolyte 44 and the interconnect (not shown); while the cathode material 42 is also in the form of a thin layer adjacent the thin layers of the electrolyte 44 and interconnect (not shown). However, in the vicinity between the manifolding regions (16, 17 and 116, 117) and electrode region (15 and 115) of the core where each electrolyte wall (30, 130) blends into the intermediate wall (132, 133), the intermediate wall is preferably fabricated of the common electrolyte wall, which could be left bare, or which could be sandwiched between thin layers 235 of inert material (see FIG. 5) so that no electrochemical reaction occurs across the wall in this region. This would minimize possible porblems in the distribution of the electrical current or potential in the manifolding region of the core, versus the electrode wall portions of the core, as the wall in this region would thus not generate any electrical potential.

All active core materials (the anode, cathode, electrolyte and interconnect) are integrally bonded or fused together to make the core 11 of a monolithic construction. However, the core 11 is actually formed of the separate materials in a sequential manner, which might take the form of several known approaches. Thus, the separate thin layers of anode, cathode, electrolyte and interconnect and inert support could be tape cast. The common separatorelectrolyte wall can be formed of a continuous layer of electrolyte and sandwichng layers of inert material in the manifolding region of the wall, and cathode and anode materials in the electrolyte core region of the wall. The interconnect wall can be similar the entire length of the core, having the common interconnect layer sandwiched between layers of the cathode and anode materials. Againwhile the materials are yet in a green or pliant stage, the electrolyte-intermediate wall would be shaped, as by vacuum drawing in a mold or by punch stamping in a mold. It then could be stacked with like units with the flat interconnect walls layered therebetween; with this sequence being repeated to form the overall core configuration. Ultimately, the stacked core configuration would be sintered or otherwise fired and heat cured in an oven or the like (not shown) at temperatures approximately 1500°-1800° C. for durations exceeding 1-2 hours and even approaching 20-40 hours, whereby it would become self supporting and dimensionally stable.

The fuel and oxidant gases would flow to the core at the purities and flow rates required, and the remaining unconsumed fuel and reaction products and oxidant would typically be combusted either in the outlet manifold or special combustion (not shown) whereat all available energies of the fuel can be completely utilized and/or burned. Generally, the pressure differential between the fuel and reaction products manifolds is quite low, and the velocity of the gases within or through the passageways 13, 14, 113 and 114 is likewise quite low.

The anode and cathode materials in the electrolyte walls are porous to the degree required to allow the fuel and oxidant gases confined on the opposite sides thereof to electrochemically combine, while the electrolyte and interconnect are impervious and serve to isolate the fuel and oxidant gases completely from one another. Likewise, the electrolyte walls are electronically or electrically nonconductive as between the cathode and anode formed on opposite sides of the electrolyte, but the electrolyte does provide ionic conductivity; and moreover both the cathode and anode are electronically or electrically conductive. On the other hand, the interconnect walls are electrically conductive and electrically connect the anode and cathode of the cells on opposite sides of the wall in series with one another.

Under one preferred embodiment, a fuel cell formed according to this invention could have as many as 10,000-15,000 separate core passageways, each of relatively small cross section, perhaps only several square mm. The electrolyte and interconnect layers might be in the range between 0.002 and 0.01 cm in thickness and preferably between 0.002 and 0.005 cm in thickness; while the anode and cathode layers each might be in the range between 0.002 and 0.05 cm in thickness and preferably between 0.005 and 0.02 cm in thickness. The intermediate wall would be the same thickness as the electrolyte wall, with the inert material preferably replacing the anode or cathode material. The monolithic core construction is believed to provide sufficient structural integrity and dimensional stability even with these wall thicknesses. The power density would be enhanced because only small amounts of nonactive support structure is used in the manifold region of the cell, and the core otherwise is formed only of the active materials.

The anode, cathode, electrolyte, interconnect and inert support materials for the layers would be matched as closely as possible to one another with respect to each coefficient of thermal expansion so as to minimize separation problems due to differential thermal expansion. The fact the material layers are extremely thin will tend to reduce this problem.

A typical cathode typically would be lanthanum manganite ($LaMnO_3$); the electrolyte would be comprised of yttria-stabilized zirconia ($ZrO_2+Y_2O_3$); and the anode would be a cobalt yttria-stabilized zirconia cermet or mixture ($Co+ZrO_2+Y_2O_3$). The interconnect might be comprised for example, of lanthanum chromite ($LaCrO_3$), where the lanthanum manganite ($LaMnO_3$) and lanthanum chromite ($LaCrO_3$) are suitably doped to obtain electrical conductivity. The inert support material might be the same material as the electrolyte.

While the structure has been disclosed as a fuel cell, it is possible with the separate manifolding of both ends of the flow passageways to operate the device as an electrolysis cell. Thus, steam can be admitted to one end of the fuel passageways and air to the corresponding end of the oxidant passageways, and in the presence of an electrical potential inputted to the device via the exterior terminals, electrolysis can take place to define hydrogen gas and steam at the outlet end of the fuel passageways and oxygen-enriched air at the outlet end of the oxidant passageways.

The embodiments of the invention in which an exclusive property or privilege is claimed are defined as follows:

1. A fuel cell for electrochemically combining fuel and oxidant for generation of galvanic output, comprising the combination of a core having an array of electrolyte and interconnect walls, each electrolyte wall consisting of cathode and anode materials respectively sandwiching electrolyte material therebetween and each interconnect wall consisting of the cathode and anode materials respectively sandwiching interconnect material therebetween, the array providing that separate sections of each electrolyte wall are arranged between separate sections of adjacent pairs of interconnect walls operable to define a plurality of substantially parallel core passageways alternately arranged respectively where the inside faces thereof are formed either of only the anode or cathode material, each anode material passageway being for the fuel and each cathode material passageway being for the oxidant, means to direct the fuel and the oxidant for separate flow through each of its respective passageway, said last mentioned means including intermediate wall means extended from the electrolyte wall in the general direction of the passageways and each being spaced generally between the adjacent interconnect walls operable to define thereby separate end chambers open to the respective passageways, duct means for inputting the fuel and oxidant to the appropriate end chamber, and means to direct the galvanic output from the anode and cathode materials to an exterior circuit.

2. An electrochemical fuel cell according to claim 1, wherein the interconnect walls are somewhat planar and are disposed substantially parallel to one another.

3. An electrochemical fuel cell according to claim 2, wherein said electrolyte walls defining said passageways are angled and back folded relative to one another and relative to and extended between the interconnect walls thereby defining flow passageways having narrow portions adjacent one interconnect wall and wide portions adjacent the other interconnect wall, and end wall sections extended between the electrolyte walls and the intermediate walls to block off the narrow portions of the flow passageways.

4. An electrochemical fuel cell according to claim 1, wherein said duct means communicate through openings in the sides of the core to the defined end chambers.

5. An electrochemical fuel cell according to claim 1, wherein the duct means communicate through openings in the interconnect walls at the top and bottom of the core with the end chambers, said core having stacks that extend between the intermediate wall and one adjacent interconnect wall operable to communicate adjacent like chambers with one another while extending transverse to the flow passageways and through the other chambers without communicating with the same.

6. An electrochemical fuel cell according to claim 1, wherein the intermediate wall is extended transverse to the flow passageways to one of the adjacent pair of interconnect wall to close off one of the end chambers and is then extended transverse to the flow passageways to the other interconnect wall of the pair to close off the other of the end chambers.

7. An electrochemical fuel cell according to claim 6, wherein the intermediate wall in the region between the end chambers is further extended flush with the wall as to establish a sealed juncture thereat.

8. An electrochemical fuel cell according to claim 6, wherein the thickness of the intermediate wall coincides with the thickness of the electrolyte wall.

9. An electrochemical fuel cell according to claim 1, wherein the intermediate wall is formed of the electrolyte material.

10. An electrochemical fuel cell according to claim 9, wherein the thickness of the intermediate wall coincides with the thickness of the electrolyte wall.

11. An electrochemical fuel cell according to claim 9, wherein each layer of the electrolyte and interconnect materials is of the order of 0.01–0.2 cm thick.

12. An electrochemcial fuel cell according to claim 9, wherein each layer of the cathode and anode materials is of the order of 0.002–0.1 cm thick.

13. An electrochemical fuel cell according to claim 9, wherein each electrolyte wall is of the order of 0.015–0.4 cm thick.

14. An electrochemical fuel cell according to claim 9, wherein each interconnect wall is of the order of 0.015–0.4 cm thick.

15. An electrochemical fuel cell according to claim 9, wherein said electrolyte walls defining said passageways are angled and back folded relative to one another and relative to and extended between the interconnect walls thereby defining flow passageways having narrow portions adjacent one interconnect wall and wide portions adjacent the other interconnect wall, and end wall sections extended between the electrolyte walls and the intermediate walls to block off the narrow portions of the flow passageways.

16. An electrochemical fuel cell according to claim 15, wherein said duct means communicate through openings in the sides of the core to the defined end chambers.

17. An electrochemical fuel cell according to claim 15, wherein the duct means communicate through openings in the interconnect walls at the top and bottom of the core with the end chambers, said core having stacks that extend between the intermediate wall and one adjacent interconnect wall operable to communicate adjacent like chambers with one another while extending transverse to the flow passageways and through the other chambers without communicating with the same.

18. An electrochemical fuel cell according to claim 15, wherein the intermediate wall is further extended transverse to the flow passageways to one of the adjacent pair of interconnect wall to close off one of the end chambers and is then extended transverse to the flow passageways to the other interconnect wall of the pair to close off the other of the end chambers.

19. An electrochemical fuel cell according to claim 18, wherein the intermediate wall in the region between the end chambers is further extended flush with the wall as to establish a sealed juncture thereat.

20. An electrochemical fuel cell according to claim 1, wherein said cathode is lanthanum manganite ($LaMnO_3$); said anode is cobalt yttria-stabilized zirconia cermet or mixture ($Co+ZrO_2+Y_2O_3$); said electrolyte is yttria-stabilized zirconia ($ZrO_2+Y_2O_3$); and said interconnect is lanthanum chromite ($LaCrO_3$).

* * * * *